(12) United States Patent
Matsui et al.

(10) Patent No.: US 7,038,825 B2
(45) Date of Patent: May 2, 2006

(54) OPTICAL DEFLECTION DEVICE AND OPTICAL SCANNING APPARATUS EQUIPPED THEREWITH

(75) Inventors: Susumu Matsui, Hachioji (JP); Hiroshi Kobayashi, Hino (JP); Takaaki Kurosawa, Kodaira (JP); Naohiro Ono, Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/650,058

(22) Filed: Aug. 27, 2003

(65) Prior Publication Data

US 2004/0145790 A1 Jul. 29, 2004

(30) Foreign Application Priority Data

Sep. 5, 2002 (JP) .............................. 2002-259812

(51) Int. Cl.
G02B 26/08 (2006.01)

(52) U.S. Cl. ..................................................... 359/216
(58) Field of Classification Search ................ 359/196, 359/197, 212–218
See application file for complete search history.

(56) References Cited

U.S. PATENT DOCUMENTS 5,726,699 A * 3/1998 Itami et al. ................. 347/257

6,424,447 B1 * 7/2002 Kaneko et al. ............. 359/216

FOREIGN PATENT DOCUMENTS

| JP | 06-37818  | 5/1994  |
|----|-----------|---------|
| JP | 07-243437 | 9/1995  |
| JP | 07-259849 | 10/1995 |
| JP | 08-114219 | 5/1996  |
| JP | 08-121471 | 5/1996  |
| JP | 07-151987 | 6/1999  |

* cited by examiner

Primary Examiner—Euncha P. Cherry
(74) Attorney, Agent, or Firm—Frishauf, Holtz, Goodman & Chick, P.C.

(57) ABSTRACT

An optical deflection device includes a rotor unit having a rotary polygon mirror and a magnet, a dynamic pressure bearing having a rotary bearing member rotatably supporting the rotor unit and a stationary bearing member, and a stator unit having a base member for supporting the stationary bearing member and a magnet coil for driving the rotary unit in cooperation with the magnet. The optical deflection device further includes a stabilizing member for rectifying and stabilizing airflow caused by the rotation of the rotary polygon mirror, which is mounted on the top of the base member in such a way that the stabilizing member is located close to the mirror surface on the outer periphery of the rotary polygon mirror.

2 Claims, 11 Drawing Sheets

FIG. 12

OPTICAL DEFLECTION DEVICE AND OPTICAL SCANNING APPARATUS EQUIPPED THEREWITH

BACKGROUND OF THE INVENTION

The present invention relates to an optical deflection device used in the image forming apparatus for a laser beam printer, laser copier, and laser facsimile, and in a barcode reader and others.

In an image forming apparatus of a laser beam printer or the like, a laser beam is applied to a rotary polygon mirror rotating at a uniform speed based on the information read by image writing means, and the reflected light is scanned and projected on a photoconductor surface, whereby image recording is carried out.

When rotating at a low speed, the polygon mirror is used as it is directly mounted on the rotary shaft of a drive motor. When the speed is high, the polygon mirror is fixed on the inner tube member, and is driven and rotated by an air dynamic bearing (air bearing) that is turned in a lifted form, without touching the inner tube member arranged at a fixed position. Further, the air dynamic bearing is driven in a non-contact state, and is therefore characterized by long service life and low noise.

The present applicant disclosed the optical deflection device using an air dynamic bearing in the Official Gazettes of Japanese Patents Laid-Open Nos. 243437/1995, 259849/1995, 114219/1996 and 121471/1996.

Known arts of stabilizing rotation by rectifying the airflow around a rotary polygon mirror are disclosed in the Official Gazettes of Japanese Utility Laid-Open No. 37818/1994 and Japanese Patent Laid-Open No. 151987/1995.

The air bearing is composed of a lower thrust plate fixed on the support base member, a stationary bearing member, an upper thrust plate and a rotatable bearing member fixing the rotary polygon mirror thereon. The rotary polygon mirror is driven and rotated by a drive motor composed of a magnet coil fixed on the base and a magnet formed integrally with the rotary polygon mirror and constituting the rotor.

The rotor unit containing the rotary bearing member rotating opposite to the stationary bearing member fixed on the support base member is rotated by radial dynamic pressure mutually in the radial air bearing. A thrust plate forming a perpendicular surface with the shaft of the stationary bearing member is fixed on the ends of both shafts of the stationary bearing member. The rotary bearing member rotating in the state sandwiched between the upper thrust plate and lower thrust plate located at upper and lower positions respectively is rotated by thrust dynamic pressure in the thrust dynamic pressure bearing member.

During rotation of the rotor driven by the drive motor composed of a magnet coil and magnet, the rotor continues smooth rotation at a high speed in a non-contact state of being lifted in air without touching the dynamic pressure bearing.

Rotation of the rotor is accompanied by rotation of the rotary polygon mirror. Laser beam emitted from semiconductor laser is applied to the photoconductor to perform deflection scanning.

The conventional optical deflection device has a problem in that, when high-speed rotation is carried out by the air dynamic bearing, rotation stability is deteriorated by increased wind loss as a load jitter characteristics are degraded.

Another problem is that the optical deflection device starting characteristics are reduced when the weight of the rotary body including the rotary polygon mirror is increased to ensure greater inertia, in order to correct the irregular speed during the rotation of the rotary polygon mirror at a uniform speed.

A further problem is that, due to an uneven distance between the optical casing accommodating the rotary polygon mirror and rotary locus of the rotary polygon mirror on the outer periphery, the rotation of the rotary polygon mirror becomes instable due to changes in pneumatic resistance in one rotation of the rotary polygon mirror.

SUMMARY OF THE INVENTION

The object of the present invention is to solve the above-mentioned problems with the optical deflection device and to provide an optical deflection device and an optical scanning apparatus equipped therewith, which ensure stabilized rotary performances with rotation at a uniform speed, without reducing the starting characteristics of the optical deflection device.

An optical deflection device of the present invention for achieving the above-mentioned object comprises: a rotor unit comprising a rotary polygon mirror and magnet for driving rotation; a dynamic pressure bearing comprising a rotary bearing member rotatably supporting the above-mentioned rotor unit and a stationary bearing member; and a stator unit comprising a base member for supporting the above-mentioned stationary bearing member and a magnet coil for driving rotation. This optical deflection device is characterized in that a stabilizer member for stabilizing airflow caused by the rotation of the above-mentioned rotary polygon mirror, is mounted on the top of the above-mentioned base member in such a way that the stabilizing member is located close to the mirror surface on the outer periphery of the above-mentioned rotary polygon mirror.

An optical scanning apparatus of the present invention to achieve the above-mentioned object comprising: an optical deflection device comprising a rotor unit having a rotary polygon mirror, a dynamic pressure bearing and a stator unit having a base member; and an optical member of a scanning optical system located inside the optical scanning apparatus main body. This optical scanning apparatus is characterized in that an air stabilizer member for stabilizing airflow caused by rotation of the above-mentioned rotary polygon mirror is arranged inside the above-mentioned optical scanning apparatus in such a way that the stabilizer member is located close to the mirror surface on the outer periphery of the above-mentioned rotary polygon mirror.

DETAILED DESCRIPTION OF THE PREFERRED EMBODIMENT

The following describes the image forming apparatus equipped with an optical deflection device and optical scanning apparatus of the present invention, with reference to drawings.

(Embodiment of an Image Forming Apparatus)

Figure 1:
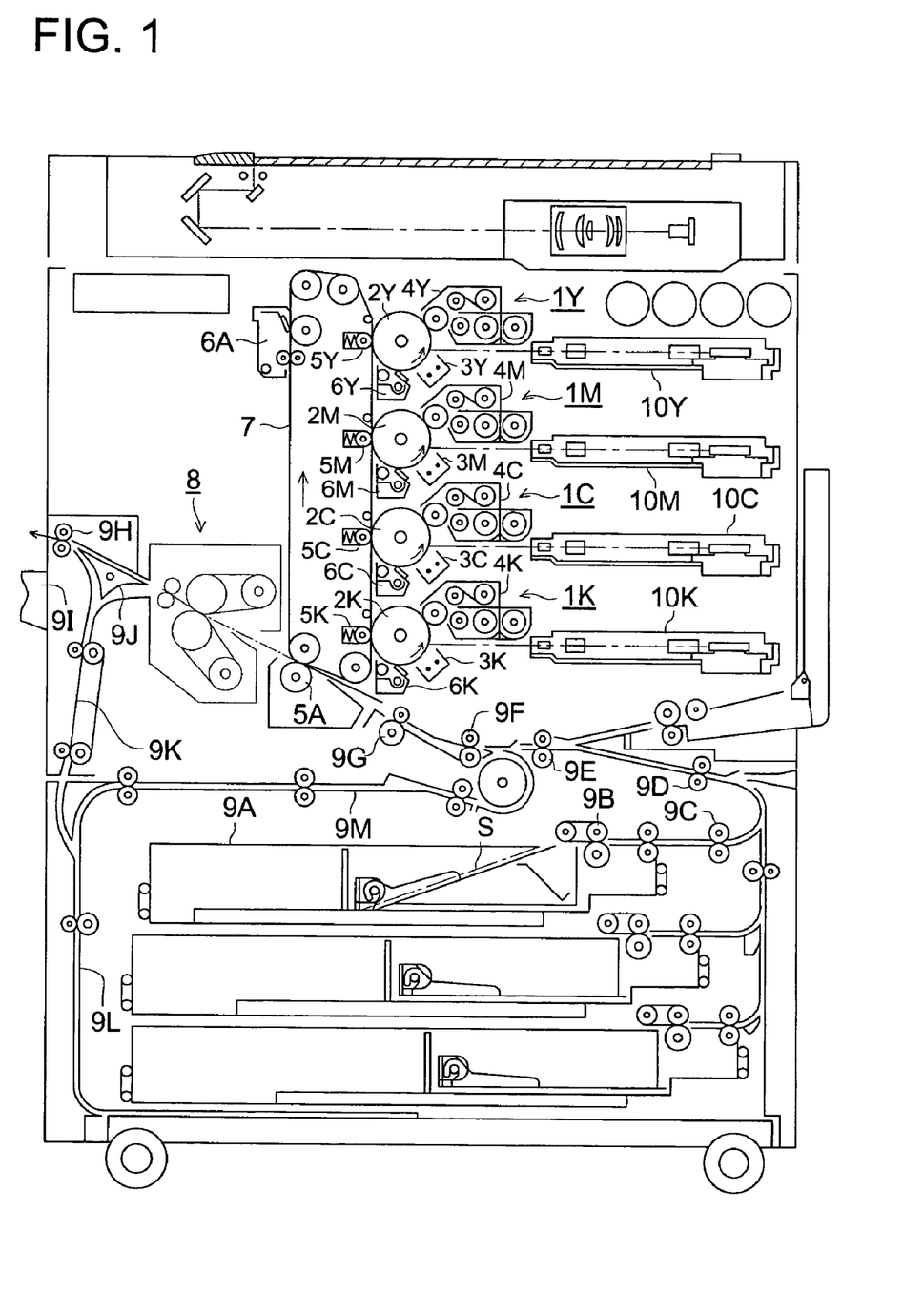
FIG. 1 is an overall configuration diagram representing a color image forming apparatus as an embodiment of the image forming apparatus equipped with an optical scanning apparatus according to the present invention.

FIG. 1 is an overall configuration diagram representing a color image forming apparatus as embodiment of the image forming apparatus equipped with an optical scanning apparatus according to the present invention.

This color image forming apparatus is what is called a tandem type color image forming apparatus. It is composed of: multiple sets of image forming sections 1Y, 1M, 1C and 1K arranged vertically; a rotatable semiconductor endless belt type intermediate transfer unit 7 which is trained about plural rollers and rotated; sheet supply means, and sheet supply and feed means 8.

An image forming section 1Y for forming a yellow image contains an electrostatic charging means 3Y arranged around an image carrier 2Y, a development means 4Y, a primary transfer means 5Y, a cleaning means 6Y and an optical scanning apparatus 10Y to be described later.

The image forming section 1M for forming a magenta image contains an image carrier 2M, an electrostatic charging means 3M, a development means 4M, a primary transfer means 5M, a cleaning means 6M and an optical scanning apparatus 10M.

The image forming section 1C for forming a cyan image contains an image carrier 2C, an electrostatic charging means 3C, a development means 4C, a primary transfer means 5C, a cleaning means 6C and an optical scanning apparatus 10C.

The image forming section 1K for forming a black image contains an image carrier 2K, an electrostatic charging means 3K, a development means 4K, a primary transfer means 5K, a cleaning means 6K and an optical scanning apparatus 10K.

Each of color images formed by the image forming sections 1Y, 1M, 1C and 1K is sequentially transferred onto the rotating intermediate transfer unit 7 by the primary transfer means 5Y, 5M, 5C and 5K, and a composite color image is formed. The transfer material (hereinafter referred to as "sheet") S stored in a sheet supply cassette 9A is supplied to the secondary transfer means 5A by the sheet supply means 9B through plural intermediate rollers 9C, 9D, 9E and 9F and registration roller 9G, and an color image is transferred on the sheet S in one operation. The sheet S with color image transferred thereon is subjected to the process of fixing by a fixing device 8. It is gripped by a sheet ejection roller 9H and is placed on the sheet ejection tray 9I.

In the double-sided image formation mode, the sheet S ejected from the fixing device 8 with image formed on the first side is branched by branching means 9J from the sheet ejection path, and enters the intermediate roller 9F through a sheet reverse and feed paths 9K, 9L and 9M located on a lower position. Sheet S having been reversed is placed on the secondary transfer means 5A through registration roller 9G, and color images are concurrently transferred onto the second surface of sheet S. Sheet S with the composite color image transferred thereon is subjected to fixing by the fixing device 8. It is gripped by sheet ejection roller 9H and is placed on the sheet ejection tray 9I.

After color image has been transferred to sheet S by the secondary transfer means 5A, the remaining toner on the intermediate transfer unit 7 from which sheet S has been separated is removed by the cleaning means 6A.

During the process of image formation, the primary transfer means 5K is constantly kept in contact with the image carrier 2K. Other primary transfer means 5Y, 5M and 5C are brought in contact with the respective image carriers 2Y, 2M and 2C only during formation of color image. The secondary transfer means 5A is brought in contact with the intermediate transfer unit 7 only when secondary transfer is made on sheet S passing through this position.

(Optical Scanning Apparatus)

The following describes an embodiment of the optical scanning apparatus equipped with the optical deflection device of the present invention with reference to drawings.

An image forming apparatus such as a laser printer has an optical scanning apparatus as image writing means, and laser beam is applied to a rotary polygon mirror of the optical deflection device rotating at a high speed based on the information read by image writing means, and the reflected light is scanned and projected on a photoconductor surface, whereby image recording is carried out.

Figure 2:
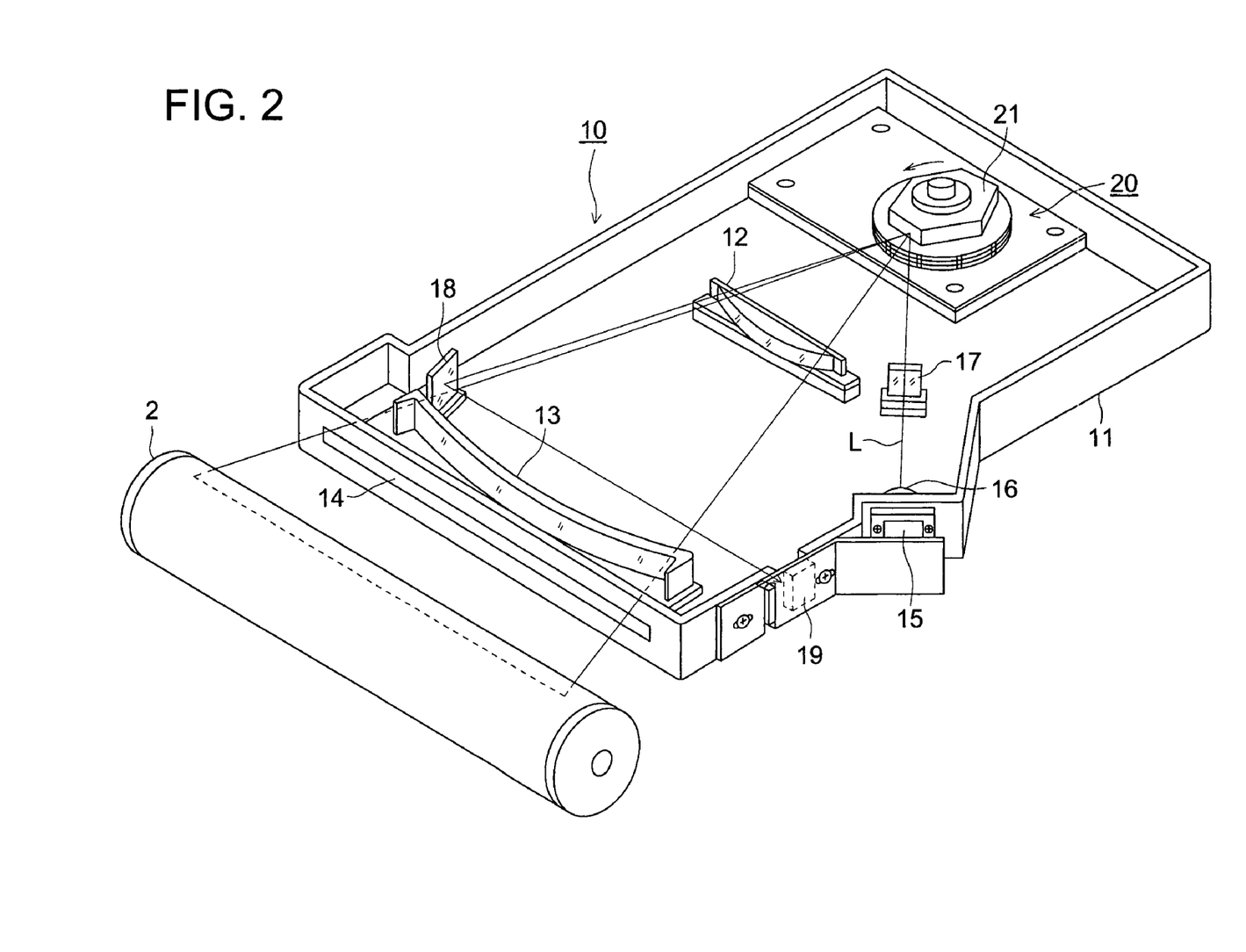
FIG. 2 is a perspective view representing an embodiment of an optical scanning apparatus.
Figure 3:
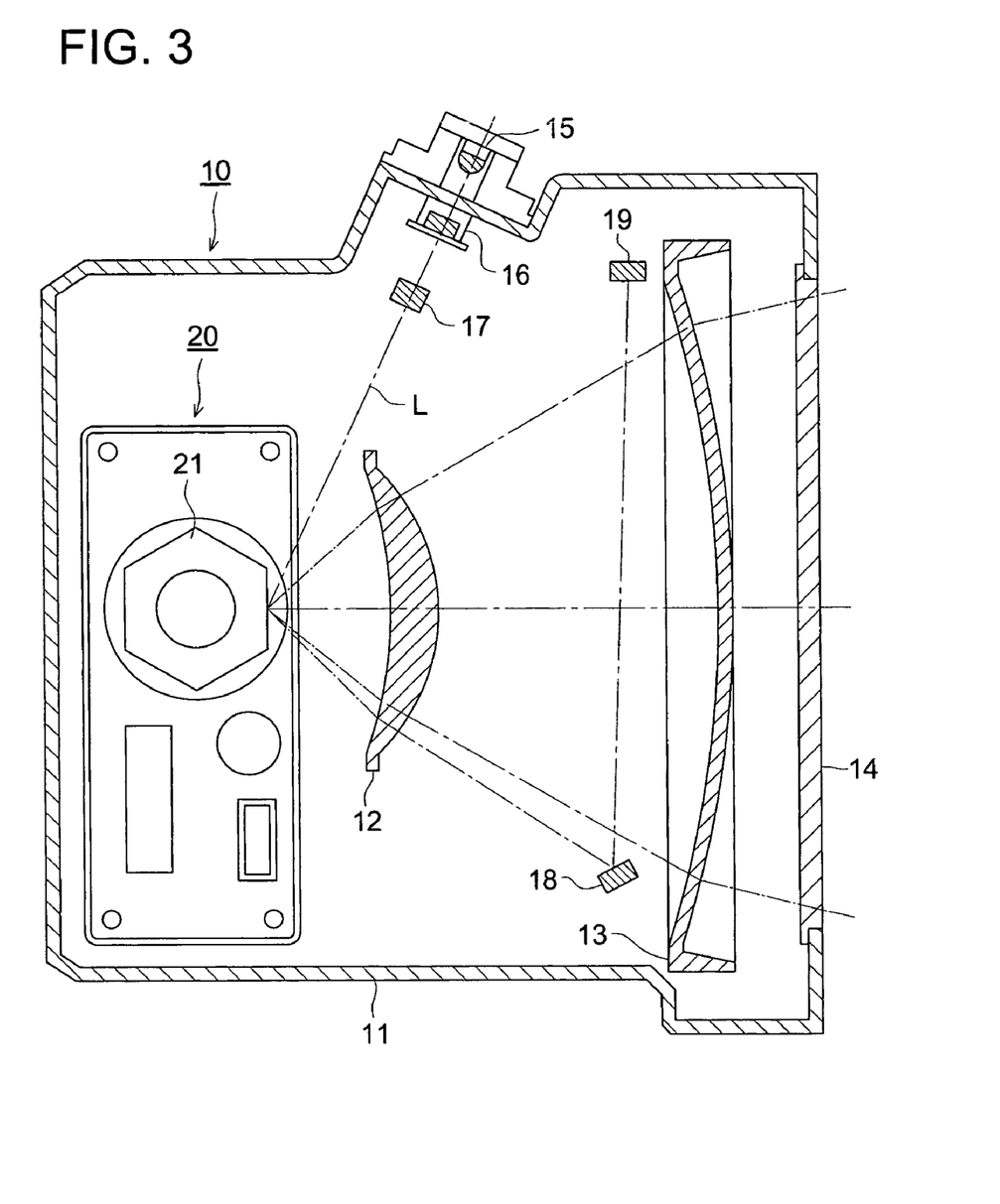
FIG. 3 is a plan view of the optical scanning apparatus.
Figure 4:
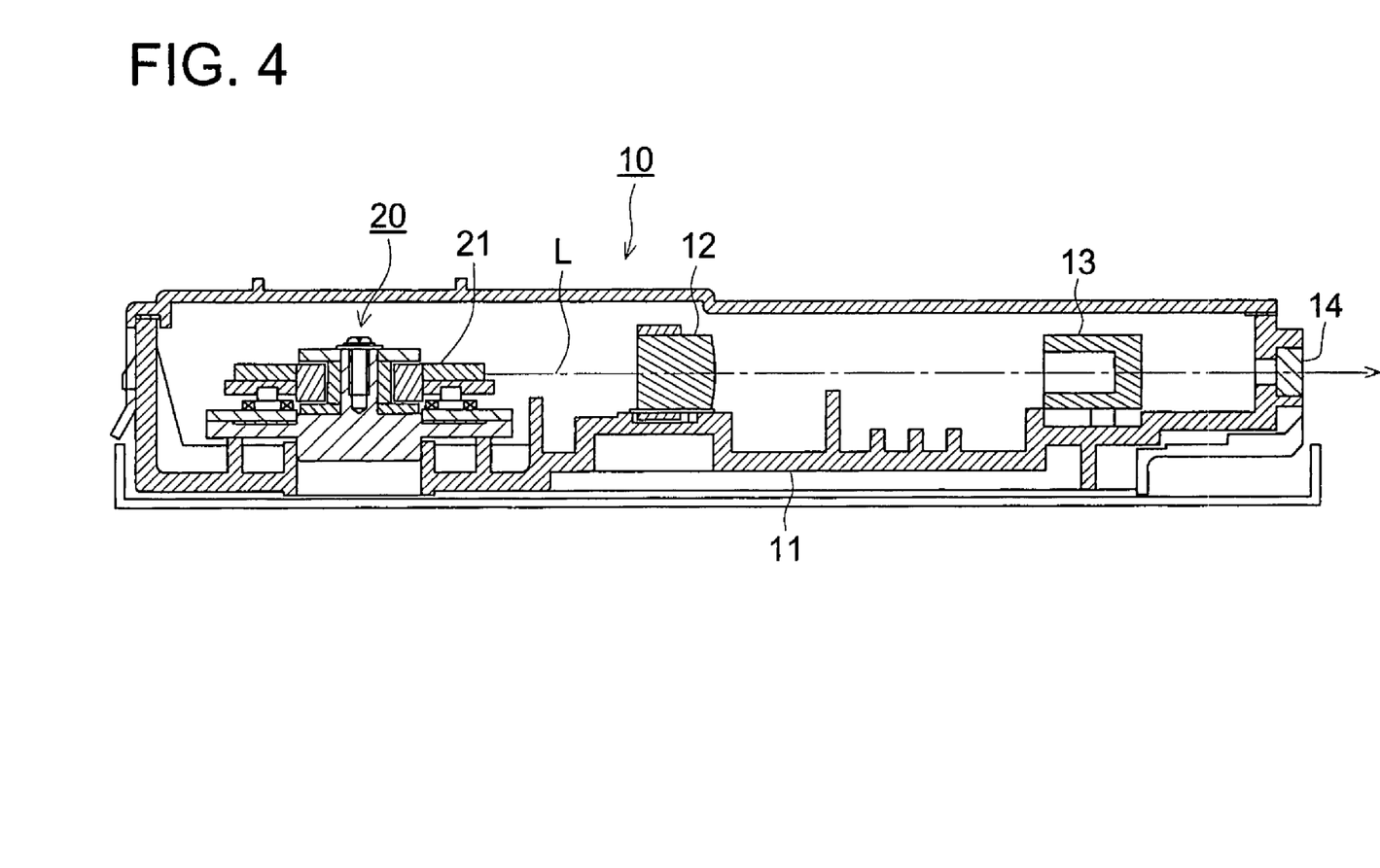
FIG. 4 is a cross sectional view of the optical scanning apparatus.

FIG. 2 is a perspective view representing embodiment of an optical scanning apparatus 10. FIG. 3 is a plan view of the optical scanning apparatus 10. FIG. 4 is a cross sectional view of the optical scanning apparatus 10.

In the tandem color image forming apparatus given in FIG. 1, the optical scanning apparatuses 10Y, 10M, 10C and 10K have almost the same shape. They will be described under the generic term of "optical scanning apparatus 10". Similarly, image carriers 2Y, 2M, 2C and 2K will be collectively called "image carrier 2" in the following description.

In these drawings, numeral 11 denotes an optical scanning apparatus main body (also called optical casing), 12 a fθ lens, 13 a second cylindrical lens, 14 a cover glass, 15 a semiconductor laser, 16 a collimate lens, 17 a first cylindrical lens, 18 an index mirror for timing detection, 19 an index sensor for synchronism detection, 20 an optical deflection device including a rotary polygon mirror 21 and others.

The above-mentioned optical deflection device 20 and optical members 12 through 19 of the scanning optical system are arranged and fixed at a predetermined position inside the optical scanning apparatus main body 11.

Laser beam L emitted from the semiconductor laser 15 is turned into parallel beams by the collimate lens 16, and enters the rotary polygon mirror 21 after having passed through the first cylindrical lens 17 of the first imaging optical system. The light reflected by the rotary polygon mirror 21 passes through the second imaging optical system including the fθ lens 12 and second cylindrical lens 13 and then through the cover glass 14. After that, scanning is performed on the peripheral surface of the image carrier 1 in the sub-scanning direction with a predetermined spot diameter in a state deviated by a predetermined pitch. Incidentally, the direction of main scanning is already adjusted by an adjusting mechanism (not illustrated). For detection of synchronism for each line, a ray bundle prior to start of scanning is led into the index sensor 19 through the index mirror 18.

In the optical deflection device 20 where the rotary polygon mirror 21 is used as a rotary body (rotor unit) for high speed rotation, a dynamic pressure bearing is provided between the rotary body and non-rotary body (stator unit) to perform high speed rotation.

(Optical Deflection Device)

Figure 5:
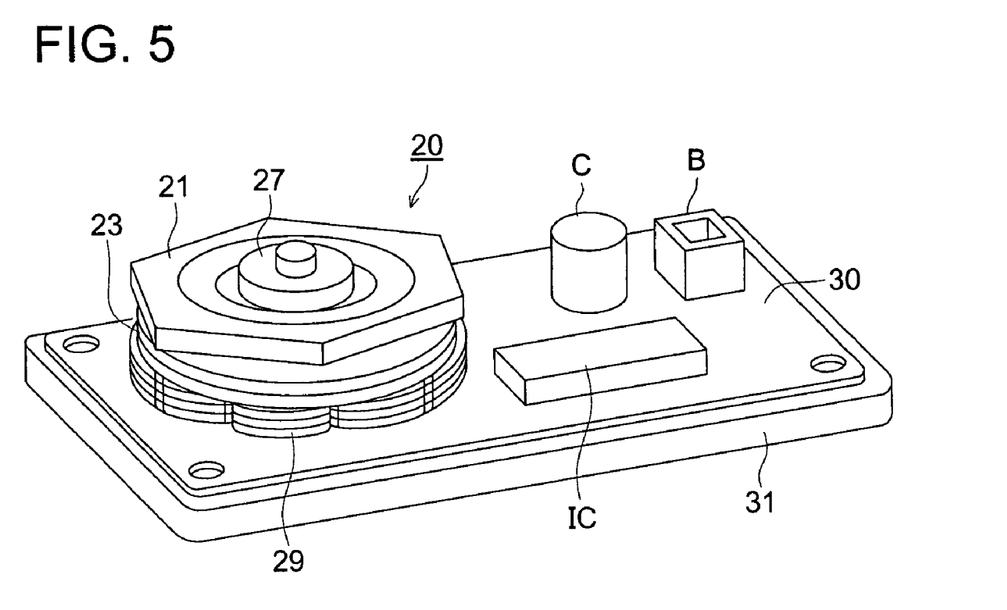
FIG. 5 is a perspective view representing an optical deflection device.

FIG. 5 is a perspective view representing an optical deflection device 20. An integrated circuit IC, capacitor C, connector B, etc. are arranged on a printed circuit board 30.

Figure 6A:
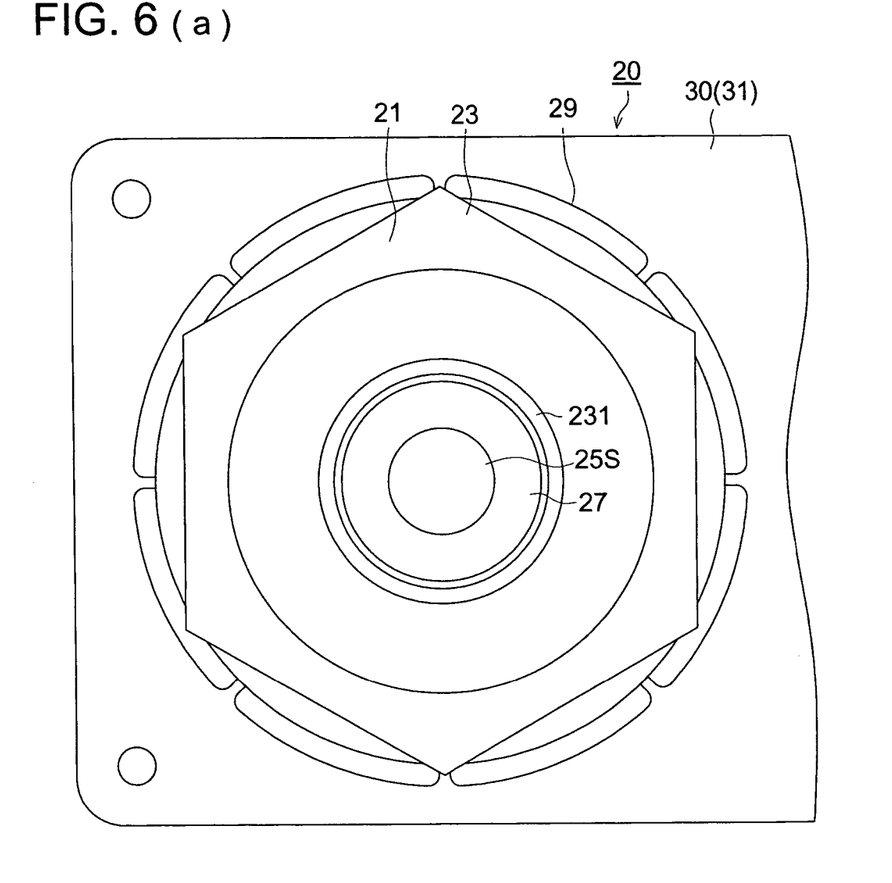
FIGS. 6(a) and 6(b) are a plan view and a cross sectional view representing an optical deflection device.
Figure 6B:
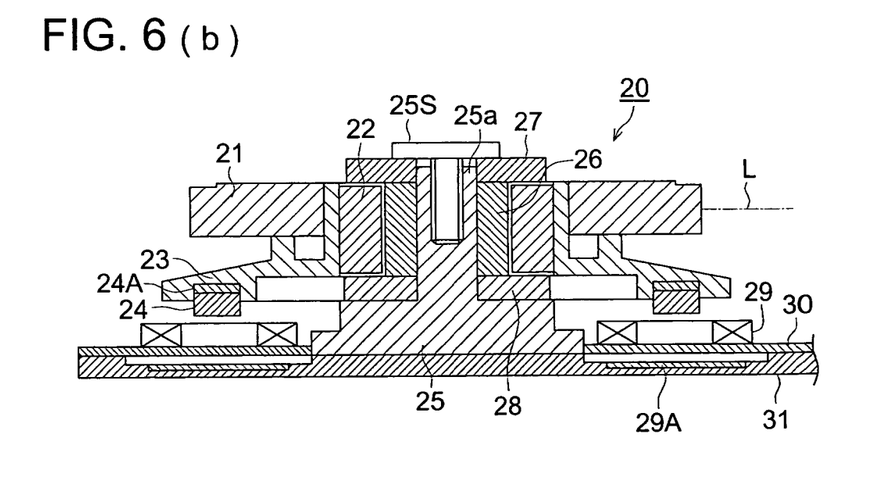

FIG. 6(*a*) is a plan view representing an optical deflection device 20, and FIG. 6(*b*) is a cross sectional view representing the same device 20.

The optical deflection device 20 comprises a rotor unit 20A and a stator unit 20B.

Figure 7A:
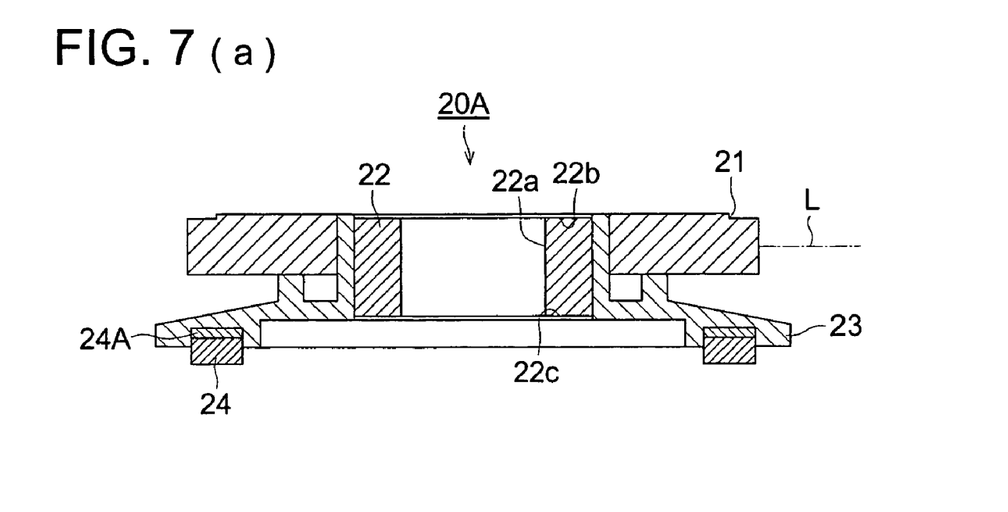
FIGS. 7(a) and 7(b) are exploded sectional views representing an optical deflection device.
Figure 7B:
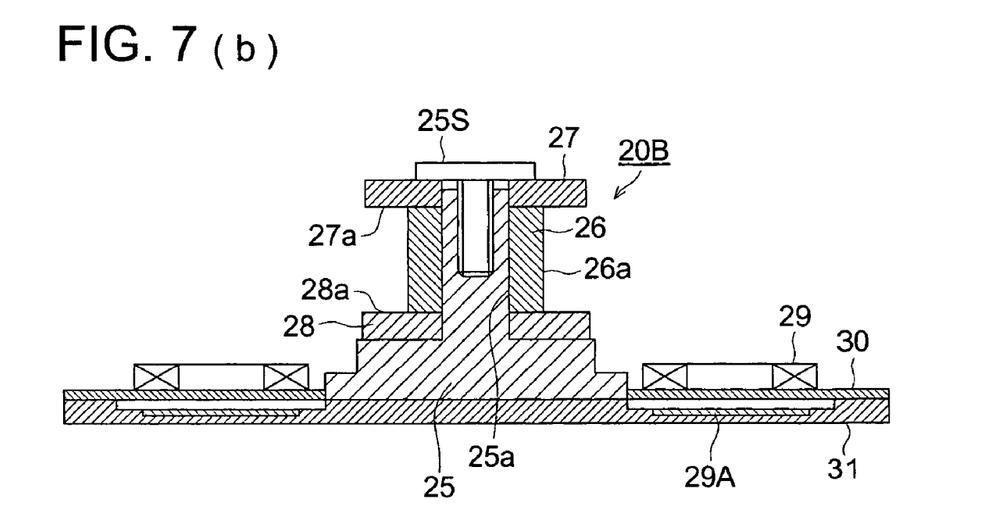

FIGS. 7(*a*) and 7(*b*) are exploded sectional views representing an optical deflection device 20. FIG. 7(*a*) is a cross sectional view of the rotor unit 20A and FIG. 7(*b*) is that of the stator unit 20B.

(Rotor Unit 20A)

The rotor unit 20A for providing high speed rotation of the optical deflection device 20 contains: a rotary polygon mirror 21, a cylindrical rotary bearing member (hereinafter referred to as "outer tube member") 22 located around a rotary shaft, a flange member 23 fixing the outer peripheral surface of the outer tube member 22 and fitted to the inner peripheral surface of the rotary polygon mirror 21, a magnet 24 for driving rotation, and a rotor yoke 24A.

The inner diameter of the outer tube member 22 is greater than the outer diameter of the fixed bearing member (hereinafter referred to as "inner tube member") 26 of the stator unit 20B by a very small adjusted distance of a few microns. The inner peripheral surface 22*a* of this outer tube member 22 and the outer peripheral surface 26*a* of the inner tube member 26 constitute a radial dynamic pressure bearing. This outer tube member 22 is formed of ceramics such as alumina or silicon nitride. This structure is preferable to ensure stable rotation.

The top end surface 22*b* of the outer tube member 22 faces the thrust surface 27*a* of the upper thrust plate 27, and constitutes an upper thrust dynamic pressure bearing. In the similar manner, the lower end surface 22*c* of the outer tube member 22 faces the thrust surface 28*a* of the lower thrust plate 28, and constitutes a lower thrust dynamic pressure bearing.

A dynamic pressure generating groove is formed on the thrust surfaces 27*a* and 28*a* of the upper thrust plate opposite to each other. The rotor unit 20A performs thrust rotation with respect to the main unit fixing section on the thrust dynamic pressure bearing.

The rotary polygon mirror 21 of the flange member 23 is made of the material having an equal thermal expansion coefficient, e.g. aluminum alloy.

A cylindrical inner tube member 26 is fixed outside the cylindrical radial shaft 25*a* standing upright on the support base 25, and a radial fixture member is formed of the radial shaft 25*a* and inner tube member 26. The inner tube member 26 is made of ceramic such as alumina and silicon nitride.

A cylindrical upper thrust plate 27 and lower thrust plate 28 are fixed on the top and bottom ends of the inner tube members 26 in the direction approximately perpendicular to the radial shaft 25*a* of the support base 25. They constitute a thrust fixture member. The upper thrust plate 27 and lower thrust plate 28 are made of ceramic such as alumina and silicon nitride. The inner tube member 26, upper thrust plate 27 and lower thrust plate 28 are mounted on the radial shaft 25*a*, and are then fixed by screws 25S.

A printed circuit board 30 with multiple magnet coil 29 arranged flush therewith is mounted on the upper surface of a base member 31. Numeral 29A indicates a stator yoke opposite to the magnet coil 29.

The support base 25, inner tube member 26, upper thrust plate 27 and lower thrust plate 28, magnet coil 29, stator yoke 29A, printed circuit board 30 and base member 31 are integrally formed into the stator unit 20B.

In the rotary 20A mounted on the stator unit 20B, the rotary polygon mirror 21 and flange member 23 rotate accurately about the rotational center of the outer tube member 22, allowing the dynamic balance to be adjusted to the minimum level.

(Optical Deflection Device Stabilizing Member)

Figure 8:
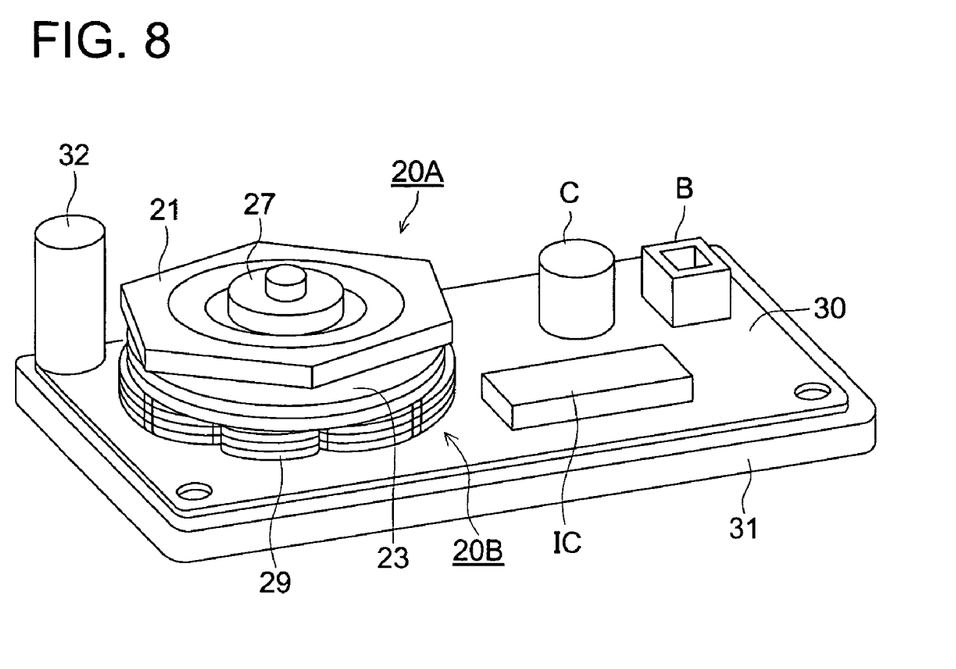
FIG. 8 is a perspective view representing the optical deflection device of the present invention.

FIG. 8 is a perspective view representing the optical deflection device 20 of the present invention.

A cylindrical stabilizing member 32 is arranged upright on the printed circuit board 30 (or base member 31) close to the mirror surface on the outer periphery of the rotary polygon mirror 21. The stabilizing member 32 rectifies and stabilizes the surrounding air produced by rotation of the rotor unit 20A. Even if there is a change in the shape of the member arranged around the rotor unit 20A, the change of jitter during rotation at a uniform speed is kept to a small level, thereby minimizing the unevenness of rotation. Incidentally, when the rotor unit 20A has started, the speed is low; hence there is a very small increase in loads without change in starting torque.

Figure 9:
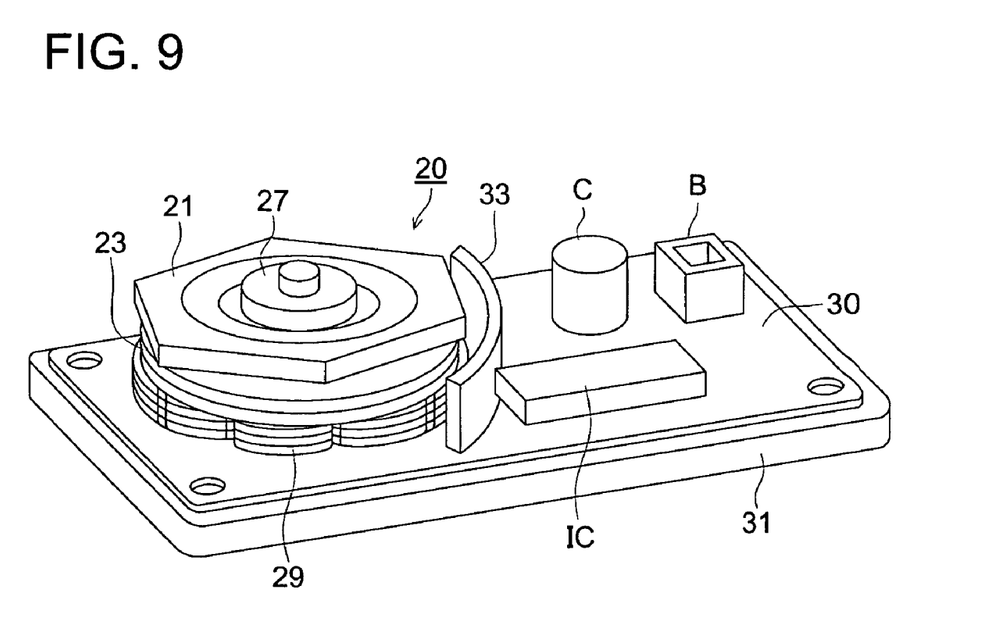
FIG. 9 is a perspective view representing the optical deflection device as another embodiment of the present invention.

FIG. 9 is a perspective view representing the optical deflection device 20 as another embodiment of the present invention.

A stabilizing member 33 having an arc-shaped wall is arranged upright on the printed circuit board 30 (or base member 31) close to the mirror surface on the outer periphery of the rotary polygon mirror 21.

The stabilizing member 33 rectifies and stabilizes the surrounding air produced by rotation of the rotor unit 20A. Even if there is a change in the shape of the member arranged around the rotor unit 20A, the change of jitter during rotation at a uniform speed is kept to a small level, thereby minimizing the unevenness of rotation.

The stabilizing members 32 and 33 are made of resin or metal.

(Stabilizing Member of Optical Scanning Apparatus)

Figure 10:
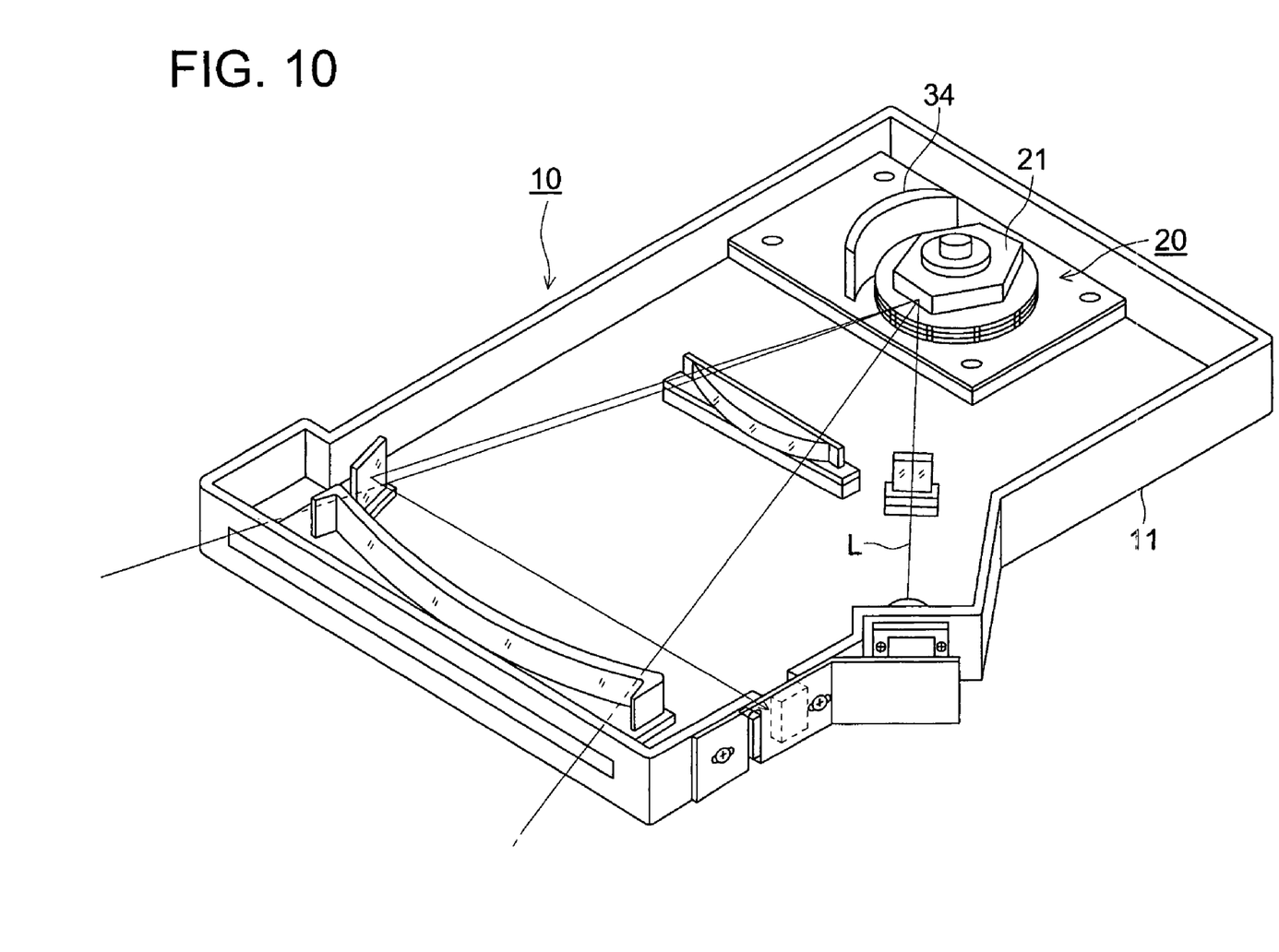
FIG. 10 is a perspective view representing the optical scanning apparatus of the present invention.

FIG. 10 is a perspective view representing the optical scanning apparatus 10 of the present invention.

A stabilizing member 34 having an arc-shaped wall is arranged upright on the printed circuit board 30 (or base member 31) close to the mirror surface on the outer periphery of the rotary polygon mirror 21. The bottom of the stabilizing member 34 penetrates the printed circuit board 30 and base member 31 and is fixed on the optical scanning apparatus main body 11.

The stabilizing member 34 provides the effect of rectifying the surrounding air, similarly to the case with the stabilizing member 33 of the optical deflection device 20 shown in FIG. 9, thereby minimizing the unevenness of rotation.

Figure 11:
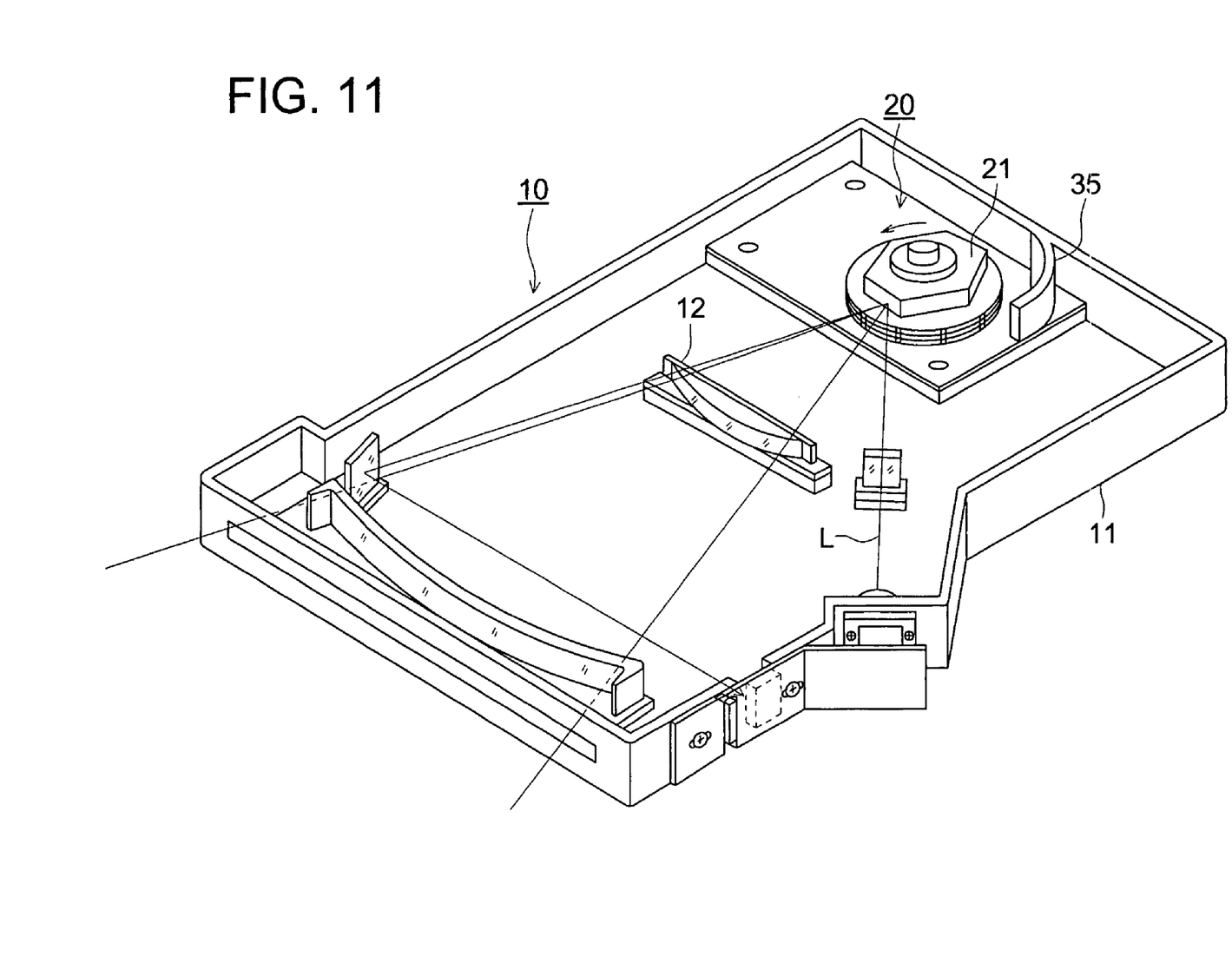
FIG. 11 is a perspective view representing the optical scanning apparatus as another embodiment of the present invention.

FIG. 11 is a perspective view representing the optical scanning apparatus 10 as another embodiment of the present invention. The stabilizing member 35 having an arc-shaped wall is arranged upright on the printed circuit board 30 (or base member 31) close to the mirror surface on the outer periphery of the rotary polygon mirror 21. The end of the stabilizing member 35 is formed integrally with the optical scanning apparatus main body 11, and is fixed on the optical scanning apparatus main body 11.

The stabilizing member 35 provides the effect of rectifying and stabilizing the surrounding air, similarly to the case with the stabilizing members 33 and 34 of the optical deflection device 20 shown in FIGS. 9 and 10, thereby minimizing the unevenness of rotation.

Figure 12:
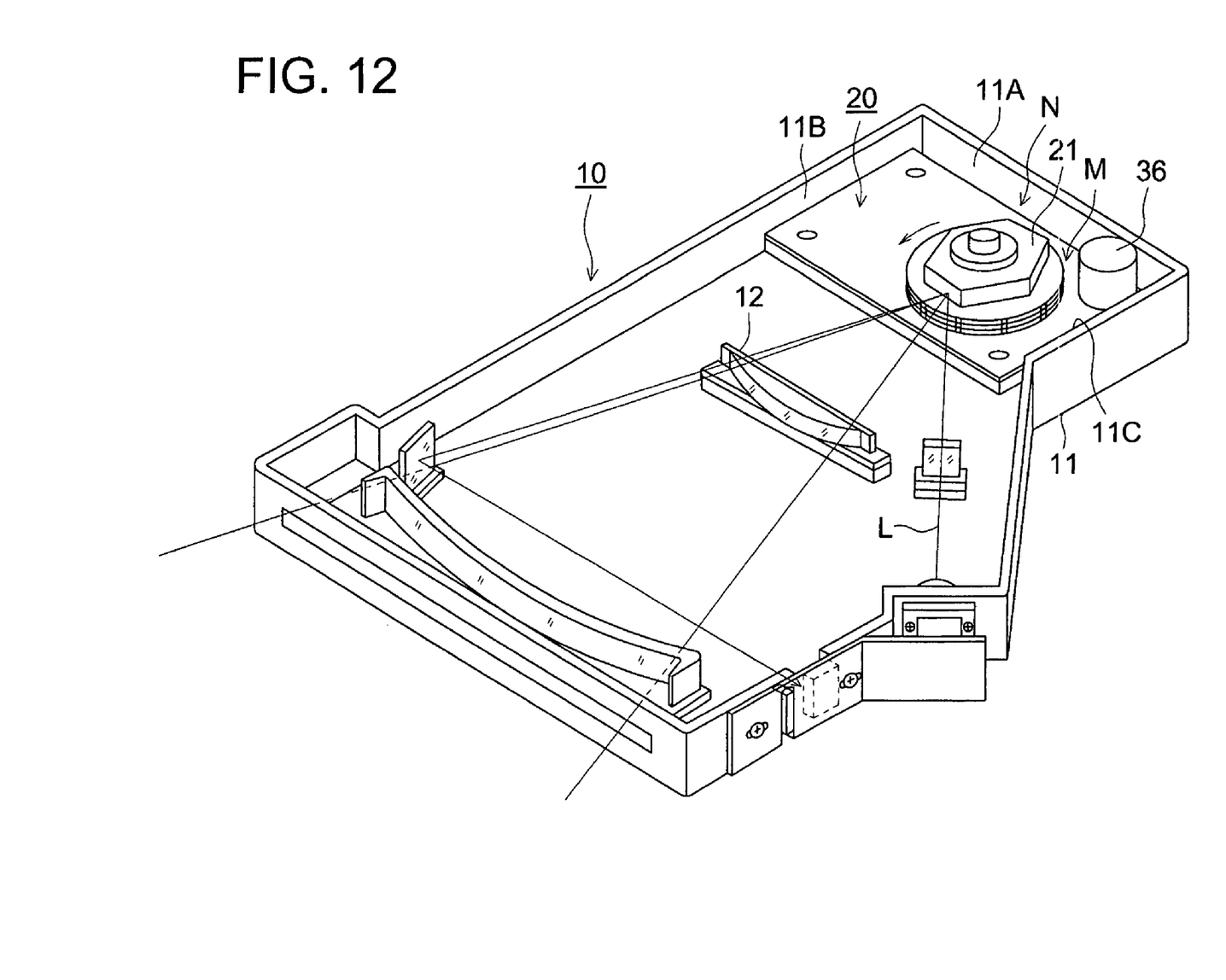
FIG. 12 is a perspective view representing the optical scanning apparatus as a further embodiment of the present invention.

FIG. 12 is a perspective view representing the optical scanning apparatus 10 as a further embodiment of the present invention.

A cylindrical stabilizing member 36 is arranged upright on the printed circuit board 30 (or base member 31) close to the mirror surface on the outer periphery of the rotary polygon mirror 21. The bottom of the stabilizing member 36 is tightened by screws together with the printed circuit board 30 and base member 31, and is fixed on the optical scanning apparatus main body 11. Incidentally, it can also be fixed using the stabilizing member 36, instead of using the male screw fitting the optical deflection device 20 to the optical scanning apparatus main body 11.

The stabilizing member is arranged in the area M where the distance between the rotary polygon mirror 21 and wall surface 11A is reduced during the rotation of the rotary polygon mirror 21 or in the area N where the distance between the rotary polygon mirror 21 and wall surface 11A is increased during the rotation. This has the great effect of preventing the abrupt change in the air pressure around the rotary polygon mirror 21 and stabilizing the rotation of the rotary polygon mirror 21. It has the great effect especially when there are differences in the distances between the rotational center of the rotation polygon mirror 21 where rotation tends to be unstable and each of the three wall surfaces 11A, 11B and 11C.

The shape of the above-mentioned stabilizing members 32 through 36 is not restricted to a cylindrical form or circular arc.

The application of the stabilizing member of the present invention is not restricted to the optical deflection device or optical scanning apparatus. This material is also applicable to such a rotary apparatus as a motor of high speed rotation provided with a radial dynamic pressure bearing and thrust dynamic pressure bearing.

The following effects are provided by the optical deflection device and optical scanning apparatus having the stabilizing member of the present invention because of the above-mentioned arrangement and characteristics.

(1) The optical deflection device of the present invention minimizes changes of jitter, despite changes in the configuration of the parts arranged around the rotary unit, and maintains the stable rotation of the rotation polygon mirror at a uniform speed.

(2) The optical scanning apparatus of the present invention minimizes changes of jitter, despite changes in the configuration of the parts arranged around the rotary unit, and maintains the stable rotation of the rotation polygon mirror at a uniform speed. It also reduces the difference in the amount of jitter of the optical deflection device alone and that of the optical deflection device alone built in the optical scanning apparatus main body, and maintains the rotation of the rotation polygon mirror at a uniform speed, with the result that high-precision image exposure is ensured.

(3) The stabilizing member of the present invention arranged on some part around the rotor unit solves such problems as increasing dimensions of the optical deflection device and optical scanning apparatus, growing parts costs, complicated assembling process and heat radiation failure.

What is claimed is:

1. An optical deflection device comprising:
(a) a rotary unit comprising a rotary polygon mirror and a magnet;
(b) a dynamic pressure bearing comprising a rotary bearing member for rotatably supporting the rotary unit and a fixed bearing member for engaging with the rotary bearing member;
(c) a stator unit comprising a base member for supporting the fixed bearing member and a magnet coil for driving the rotary unit in cooperation with the magnet; and
(d) a stabilizing member which is shaped as a solid cylinder and which is provided on an upper portion of the base member and in a vicinity of an outer circumference of the polygon mirror to stabilize air flow generated by rotation of the polygon mirror,
wherein the stabilizing member has a height greater than a height of a lower surface of the rotary polygon mirror; and
wherein the stabilizing member is provided in an area on a side of the polygon mirror between the polygon mirror and a side wall of a main body of the optical scanning apparatus.

2. An optical scanning apparatus comprising:
(a) a main body;
(b) an optical deflection device provided in the main body, said optical deflection device comprising a rotor unit including a rotary polygon mirror, a dynamic pressure bearing for rotatably supporting the rotor unit, and a stator unit including a base member for supporting the dynamic pressure bearing;
(c) an optical member of a scanning optical system provided in the main body; and
(d) a stabilizing member which is shaped as a solid cylinder and which is provided in a vicinity of an outer circumference of the polygon mirror inside the main body to stabilize air flow generated by rotation of the polygon mirror;
wherein the stabilizing member has a height greater than a height of a lower surface of the rotary polygon mirror; and
wherein the stabilizing member is provided in an area on a side of the polygon mirror between the polygon mirror and a side wall of the main body of the optical scanning apparatus.

* * * * *